United States Patent [19]

Watanabe

[11] 4,025,132
[45] May 24, 1977

[54] BEARING UNIT

[75] Inventor: Katsuro Watanabe, Sakai, Japan

[73] Assignee: Wada Seiko Kabushiki Kaisha (Wada Seiko Co., Ltd.), Sakai, Japan

[22] Filed: Sept. 24, 1975

[21] Appl. No.: 616,195

[30] Foreign Application Priority Data
Oct. 1, 1974   Japan .................. 49-119097[U]

[52] U.S. Cl. ...................... 308/36.1; 308/187.1
[51] Int. Cl.² .......................................... F16C 1/24
[58] Field of Search ............ 308/36.1, 187, 187.1, 308/187.2, 121

[56] References Cited
UNITED STATES PATENTS

| | | |
|---|---|---|
| 3,290,101 | 12/1966 | Reckvagel .................. 308/187 |
| 3,655,249 | 4/1972 | Abel .......................... 308/121 X |
| 3,770,992 | 2/1971 | Veglia ........................ 308/187.2 |
| 3,899,226 | 8/1975 | Frost et al. ................ 308/187.1 |

Primary Examiner—Joseph F. Peters, Jr.
Assistant Examiner—Gene A. Church
Attorney, Agent, or Firm—George B. Oujevolk

[57] ABSTRACT

A bearing unit which has a pair of cover members fixed to the outer race of a bearing to hold grease between the inner and outer races and to protect the bearing against dust. The cover members are formed with notches or holes in their peripheral wall for easy molding of a member such as a pulley on the outer race so as to be integral with the cover members and thus with the outer race.

5 Claims, 6 Drawing Figures

BEARING UNIT

The present invention relates to a bearing unit which includes a ball bearing with a pair of cover members secured to the outer race of the bearing to make it dustproof and to retain a larger amount of grease therebetween.

Conventional bearings are used with grease filled between their outer and inner races for antifriction, but without any suitable means for retaining grease. As the shaft supported by the bearing rotates, most of grease is forced from between them, thus causing trouble resulting from abrasion due to insufficient grease.

It is an object of the present invention to provide a bearing unit which obviates such a shortcoming of the prior art by providing means for retaining a larger amount of grease between the inner and outer races with minimum leakage, thereby assuring satisfactory service for a prolonged period of time.

It is another object of the present invention to provide a bearing unit which is better protected against dust.

It is a further object of the present invention to provide a bearing unit which allows easy formation of a molded member on the outer race so as to be integral therewith and is therefore suited for mass production.

In accordance with the present invention, there is provided a bearing unit which includes a cover member secured to one or both sides of the outer race to enclose the inner and outer races at the ends thereof for the sealing-in of grease and protection against dust and which allows easy mounting of molded member over the outer race.

Other features and objects of the present invention will become apparent from the following description with reference to the accompanying drawings, in which.

Figure 1:
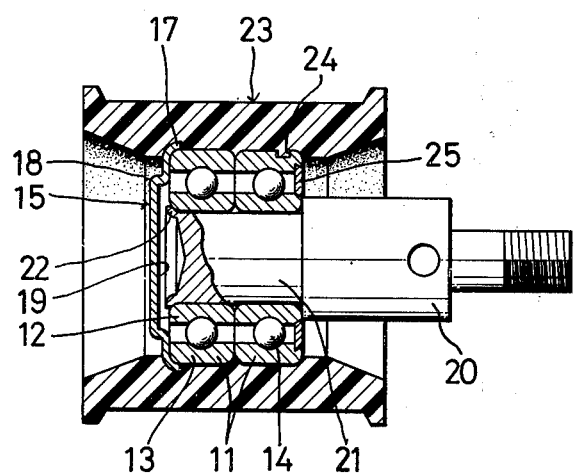
FIG. 1 is a longitudinal sectional view of a bearing unit according to the present invention.

Referring to FIG. 1, each bearing 11 has an outer race 13 mounted over an inner race 12 with a suitable spacing to rotatably hold a plurality of balls 14 therebetween. This arrangement is quite the same as that of conventional ball bearings.

One major feature of the present invention is that a cover member 15 is fixed to the outer race 13 of the bearing 11. It may be made of metal, rubber, or plastic. The cover member 15 is in the form of a circular plate of substantially the same diameter as that of the outer race 13, formed with a peripheral wall 17 turned inwardly to fit on the outer periphery of the outer race 13. The cover member 15 is secured to the outer race 13 at one end thereof as with adhesive.

The cover member 15 is also formed with an outwardly protruding portion 18 which is of a larger outer diameter than that of the inner race 12 to keep itself clear of the latter. The protruding portion 18 defines a grease chamber 19 which communicates with the space between the outer and inner races 12 and 13.

In the embodiment of FIG. 1 two bearings 11 are mounted side by side on the small diameter portion 21 of a fixed shaft 20 with the one provided with the cover member 15 outside. The small diameter portion 21 is formed at its outer end with an annular projection 22 which is calked outwardly to provide means for preventing the bearings 11 from falling off.

On the bearings 11 is formed an annular molded member 23 which is molded of nylon, ABS resin, glass fiber reinforced resin or other hard synthetic resin. To form the same, the bearings 11 mounted on the fixed shaft 20 are inserted into a mold and synthetic resin is injected thereinto to mold the annular member 23 integral with the bearings 11. The resin embeds the outer periphery of the outer races 13 and the peripheral wall of the cover member 15.

Eccentric grooves 24 are also formed in the outer periphery of the outer race 13 so as to be filled with synthetic resin to prevent rotation of the annular molded member 23 relative to the bearing 11. An annular packing 25 is provided between the outer and inner races of the inner bearing at the inner end thereof with its outer periphery fixed to the outer race 13 and its inner periphery slidably butting against the inner race 12 to seal out dust and seal in grease.

The annular molded member 23 is given a suitable shape for use as a tension pulley for transmission belts, for example. The first embodiment described above sealedly holds grease in the grease chamber 19 defined by the cover member 15 and the inner race 12 and the outer race 13 for lubrication of rotating surface, the cover member 15 serving also for protection against dust.

Figure 2:
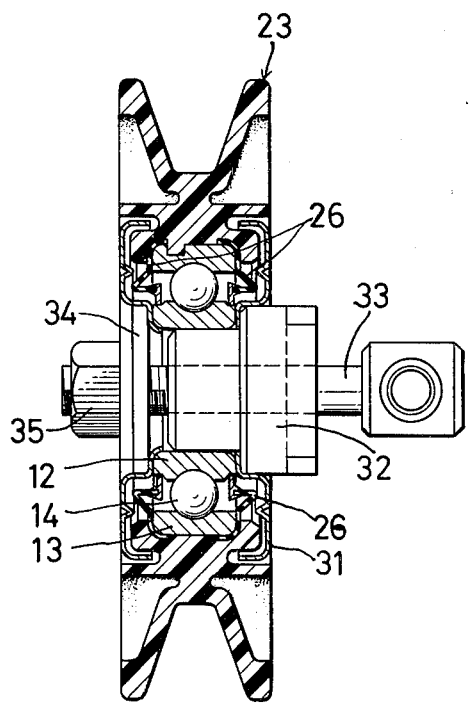
FIG. 2 is a longitudinal sectional view of a second embodiment thereof.
Figure 3:
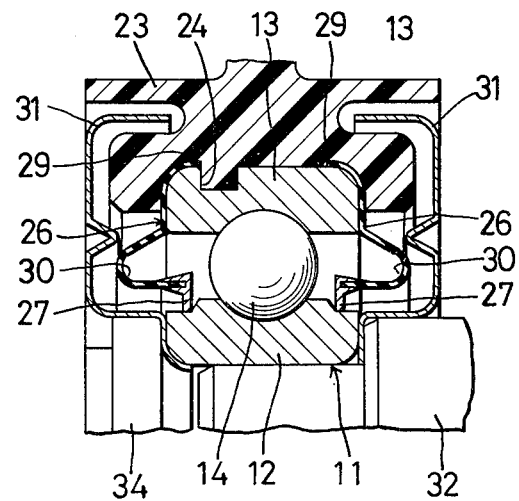
FIG. 3 is a partial enlarged longitudinal sectional view of the embodiment of FIG. 2.

A second embodiment shown in FIGS. 2 and 3 includes an opposed pair of annular cover members 26 each provided with an annular packing 27 at its inner periphery. The cover member 26 is in the form of an annular plate formed with a peripheral wall 29 inwardly turned to fit on the outer race 13 and with an outwardly protruding portion at a position opposite to the space between the outer and inner races. The annular packing 27 has a forked portion at its outer periphery engaged with the inner edge of the cover member 26 and its inner periphery slidably butting against the outer periphery of the inner race 12.

A cover member 26 is secured to each side of the bearing 11 to cooperate with the packing 27 to closely enclose the gap between the outer race 12 and the inner race 13 not to allow grease filled therebetween to leak out. The protruding portions of the cover members 26 define a grease chamber 30.

On the bearing 11 in FIG. 2 is formed an annular molded member 23 in the same manner as described above. On each side of the bearing 11 is set an annular dust seal 31 with its inner periphery secured to the inner race 12 to enclose the corresponding cover member 26.

The bearing 11 with the annular molded member 23 is mounted on a collar or fixed shaft 32 and is secured thereon by tightening a nut 35 with a washer 34 on a bolt 33 inserted through the collar 32. The molded member 23 is now rotatably mounted on the collar 32 through the bearing 11 for use as an idle pulley, for example.

Figure 4:
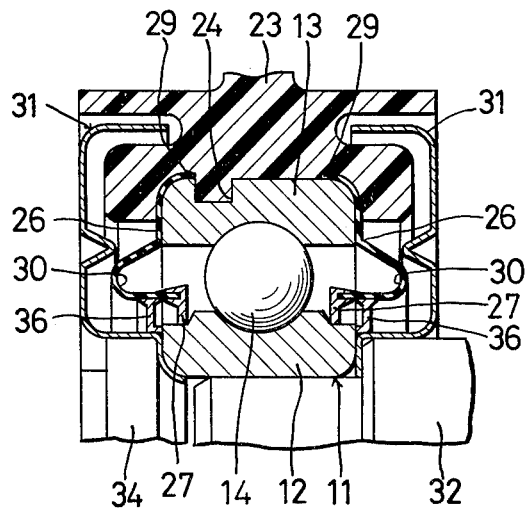
FIG. 4 is a view, similar to FIG. 3, of a third embodiment having an additional packing.

Another embodiment of FIG. 4 is the same as that of FIG. 2 except that another opposed pair of annular packings 36 are provided at the inner periphery of the cover member 26. Each annular packing 36 is of L-shape section with its outer periphery fixed to the inner periphery of the corresponding cover member at an outer position than the packing 27 and its inner periphery sliding against the outer periphery of the inner race 12. This double packing provides better seal of grease and better guard against dust.

Figure 5:
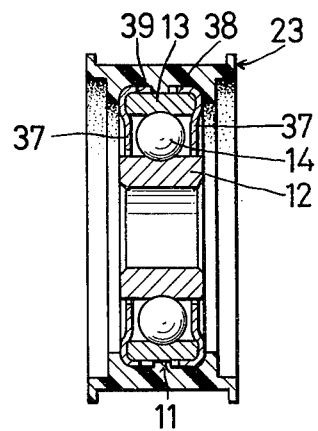
FIG. 5 is a longitudinal sectional view of a fourth embodiment.
Figure 6:
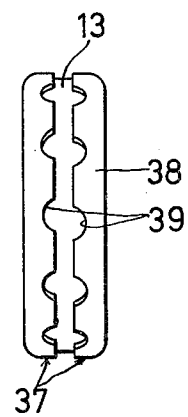
FIG. 6 is a front view of the embodiment of FIG. 5 with no molded member formed.

FIGS. 5 and 6 show a fourth embodiment of the present invention which permits easy molding of the annular molded member 23 so as to be integral with the cover members 37 and which is therefore more suited for mass production.

To each end of the outer race 12 is secured (as by adhesion) an annular cover member 37 having its peripheral wall formed with a plurality of notches 39 at a suitable interval. In molding the member 23, synthetic resin fills the notches 39 and settles there to make the molded member 23 integral with the cover members 37. The cover members 37 may have their peripheral wall formed with holes or corrugation, instead of notches, to obtain the same effect.

The material injection pressure for injection molding and the contraction pressure after molding press the peripheral wall 38 of the cover members 37 against the outer race 13, so that the cover members 37 are secured to the outer race 13 with a greater strength.

Although in the embodiment of FIG. 5 the cover members 37 have their inner periphery merely slidably butting against the outer periphery of the inner race 12, an annular packing may be preferably attached to the inner periphery of each cover member 37 to provide better seal of grease as in the aforesaid embodiments.

It will be understood that the bearing unit according to the present invention can retain grease over a longer period and is better guarded against dust thanks to the cover members 37, thus having longer working life. The cover members define a grease chamber holding a larger amount of grease and eliminate the need of replenishing grease frequently in a small amount at a time, thus permitting use for longer time without replenishment of grease.

According to the present invention, an annular molded member can be easily and securely formed on the bearing so as to prevent rotation relative to the outer race.

While the present invention has been particularly shown and described with reference to preferred embodiments thereof, it will be understood by those skilled in the art that the foregoing and other changes can be made therein without departing from the spirit and scope of the invention.

What is claimed is:

1. A bearing unit comprising a bearing having an inner race and an outer race, and an opposed pair of cover members secured to said outer race at each end thereof to enclose the gap between the inner and outer races of said bearing, and an annular molded member of synthetic resin molded on the outer race with the interposition of said pair of cover members, integral with said cover members and the outer race thereby retaining grease therebetween and protecting said bearing against dust.

2. A bearing unit according to claim 1, in which said opposed pair of cover members are in the form of annular plates having a peripheral wall turned inwardly to fit on the outer periphery of the outer race.

3. A bearing unit according to claim 1, in which at least one annular packing is fixed to the inner periphery of said each cover member at the outer periphery thereof with the inner periphery thereof slidably butting against the outer periphery of the inner race.

4. A bearing unit according to claim 1, in which said each cover member is formed with an outwardly protruding portion opposite to the gap between the inner and outer races to define a grease chamber capable of holding a large amount of grease.

5. A bearing unit according to claim 2, in which said each cover member is formed with a plurality of notches in said peripheral wall thereof to enable said annular molded member to be molded so as to be integral with said cover members and the outer race, whereby preventing rotation of said annular molded member relative thereto.

* * * * *